UNITED STATES PATENT OFFICE.

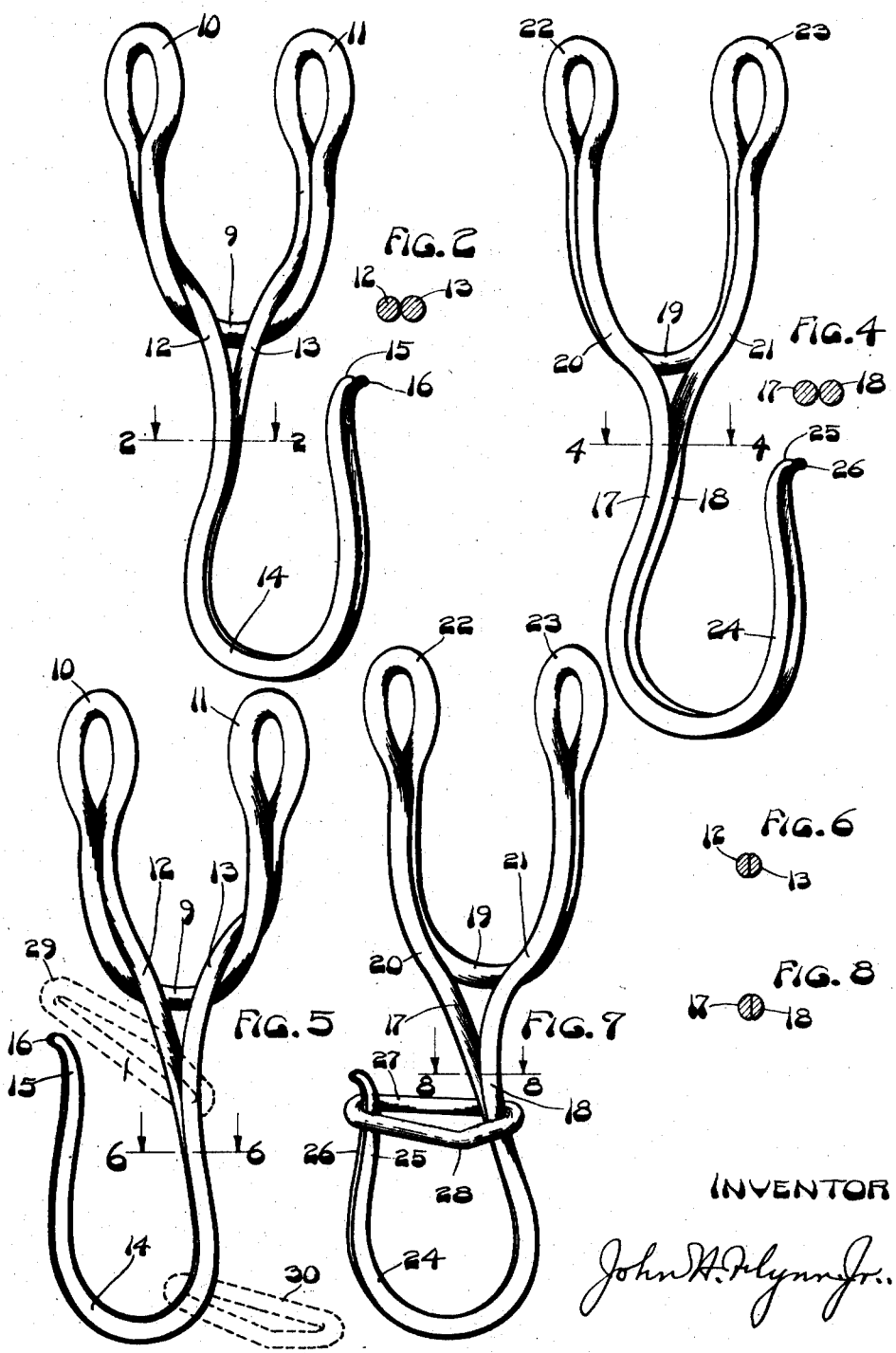

JOHN H. FLYNN, JR., OF CINCINNATI, OHIO, ASSIGNOR TO THE EUREKA TACKLE BLOCK COMPANY, OF CINCINNATI, OHIO.

INTEGRAL HOOK AND SHACKLE FOR PULLEY-BLOCKS.

1,365,677.   Specification of Letters Patent.   Patented Jan. 18, 1921.

Application filed April 26, 1920. Serial No. 376,570.

*To all whom it may concern:*

Be it known that I, JOHN H. FLYNN, Jr., a citizen of the United States, residing in Cincinnati, in the county of Hamilton and State of Ohio, have invented new and useful Improvements in Integral Hooks and Shackles for Pulley-Blocks, of which the following is a specification.

An object of my invention is to produce an improved hook and shackle in which the shackle is formed integrally with the hook for increasing the strength thereof and for facilitating the handling of the hook and shackle with the attached ropes and pulley block.

This and other objects are attained in the combined hook and shackle described in the following specification and illustrated in the accompanying drawing in which:

Figure 1 is a perspective view of an integral hook and shackle embodying my invention.

Fig. 2 is a transverse sectional view taken on the line 2—2 of Fig. 1.

Fig. 3 is a perspective view of an integral hook and shackle embodying my invention, showing a different form thereof.

Fig. 4 is a transverse sectional view taken on the line 4—4 of Fig. 3.

Fig. 5 is a perspective view of a modified form of my invention.

Fig. 6 is a transverse sectional view taken on the line 6—6 of Fig. 5.

Fig. 7 is a perspective view of another modified form of my invention.

Fig. 8 is a transverse sectional view taken on the line 8—8 of Fig. 7.

In Figs. 1 and 2 of my invention I have shown a form of integral hook and shackle which is constructed of round material, the piece being constructed by bending the length of round stock into U shape 9 centrally of its length then bending both ends back at points making the proper length of shackle and simultaneously forming eyes or loops 10 and 11 at the ends of the shackle. These ends are then brought back through the U as shown at 12 and 13, being then bent together and into hook shape 14 with the ends turned outwardly as shown at 15 and 16.

In the form of integral construction shown in Figs. 3 and 4 the ends 17 and 18, instead of being brought through the U 19, are merely laid over against it and in conformance to the curvature thereof as shown at 20 and 21, eyes 22 and 23 being formed at the upper ends of the U as in the previous construction. A hook 24 is then formed of the ends and tips 25 and 26 turned outwardly as shown.

Figs. 5 and 6 are of the general form shown in Figs. 1 and 2, but instead of in round form the material is of half round form with the flat sides together as shown in Fig. 6. The same reference numerals as used in Fig. 1 are used for convenience in the showing of Fig. 5.

In Figs. 7 and 8 the construction is the same in all respects as in Figs. 3 and 4, but as in the construction of Figs. 5 and 6 the material is of half round shape. This form bears the same reference numerals as the form shown in Figs. 3 and 4.

As an added feature adapted to strengthen the hook of any of the forms shown, I have provided a link 27 which has one side 28 somewhat bowed. The position of the link when in operative relation with the hook, is shown in Fig. 7, but when the link is to be removed it is lifted from the hooked end as shown in dotted lines in Fig. 5 at 29 and then dropped to position 30 when it may be removed easily. Should the load on the hook be so great as to bend it outwardly and prevent removal of the link, the bent side 28 may be hammered to straighten it and thus lengthen the link and permit its removal.

An advantage of the use of half round material, which I prefer is that the position of the half round with the flat sides together causes the hook to have more strength, likewise the shackle, the same principle applying to this as is used in the placing of a beam with its depth in vertical position and its narrower width in horizontal position. These forms are therefore preferred by me over the round forms because of the saving in material and light weight of construction.

Having thus described my invention what I claim is:

1. An integrally formed shackle and hook consisting of a length of material having a centrally located U-shaped section with the ends bent back upon the U, the bend having loops at the ends of the U, the ends beyond the U being brought together and bent into hook shape.

2. An integrally formed shackle and hook consisting of a length of material having a centrally located U-shaped section with the ends bent back upon the U and passing between the branches thereof, the bend having loops at the ends of the U, the ends beyond the U being brought together and bent into hook shape.

3. An integrally formed shackle and hook consisting of a length of substantially half round material having a centrally located U-shaped section with the ends bent back upon the U, the bend having loops at the ends of the U, the ends beyond the U being brought together and bent into hook shape.

4. An integrally formed shackle and hook consisting of a length of substantially half round material having a centrally located U-shaped section with the ends bent back upon the U and passed between the branches thereof, the bend having loops at the ends of the U, the ends beyond the U being brought together and bent into shape.

5. An integrally formed shackle and hook consisting of a length of material having a centrally located U-shaped section with the ends bent back upon the U, the bends having loops at the ends of the U, the ends beyond the U being brought together and bent into hook shape, and a bowed link on the hook adapted to be disengaged from the end of the hook when the hook is in normal condition and to be elongated for disengagement from the hook when the hook becomes distorted.

In witness whereof I affix my signature in the presence of two witnesses.

JOHN H. FLYNN, Jr.

Witnesses:
S. C. SWARTSEL,
W. J. SCHULTZ.